United States Patent [19]
Mihm, Jr. et al.

[11] Patent Number: 5,293,576
[45] Date of Patent: Mar. 8, 1994

[54] COMMAND AUTHENTICATION PROCESS

[75] Inventors: Thomas J. Mihm, Jr., Mesa; Robert E. Penny, Jr., Gilbert, both of Ariz.

[73] Assignee: Motorola, Inc., Schaumburg, Ill.

[21] Appl. No.: 795,610

[22] Filed: Nov. 21, 1991

[51] Int. Cl.⁵ .............................................. H04K 1/00
[52] U.S. Cl. ........................................ 380/21; 380/25; 380/46; 380/50
[58] Field of Search ......................... 380/21, 25, 46, 50

[56] References Cited

U.S. PATENT DOCUMENTS

| | | | |
|---|---|---|---|
| Re. 31,189 | 3/1990 | Lee et al. | 380/21 |
| 4,145,568 | 3/1979 | Ehrat | 380/50 |
| 4,688,250 | 8/1987 | Corrington et al. | 380/23 |
| 4,733,345 | 3/1988 | Anderson | 380/25 |
| 4,860,352 | 8/1989 | Laurance et al. | 380/23 |
| 4,912,722 | 3/1990 | Carlin | 380/21 |
| 5,003,596 | 3/1991 | Wood | 380/50 |
| 5,093,860 | 3/1992 | Steinbrenner et al. | 380/21 |
| 5,144,665 | 9/1992 | Takaragi et al. | 380/21 |
| 5,175,766 | 12/1992 | Hamilton | 380/25 |

*Primary Examiner*—Salvatore Cangialosi
*Attorney, Agent, or Firm*—Robert M. Handy

[57] ABSTRACT

A slave station, such as an orbiting satellite, and a master station, such as a ground control station, have their own lists of random pads. The master and slave station lists are identical. When the master station sends a critical command to the slave station, a selected one of the pads is combined with the command and transmitted to the slave station as a data communication message. Each pad is used only once. The slave station evaluates the received pad value using its version of the same selected pad. If the evaluation detects correspondence, then the command is authenticated and the slave station acts upon the command. The random pads are generated by the slave station. They are encrypted using an asymmetric encryption process and transmitted to the master station so that the master and slave stations will operate on common sets of pads.

49 Claims, 7 Drawing Sheets

MASTER STATION

SLAVE STATION

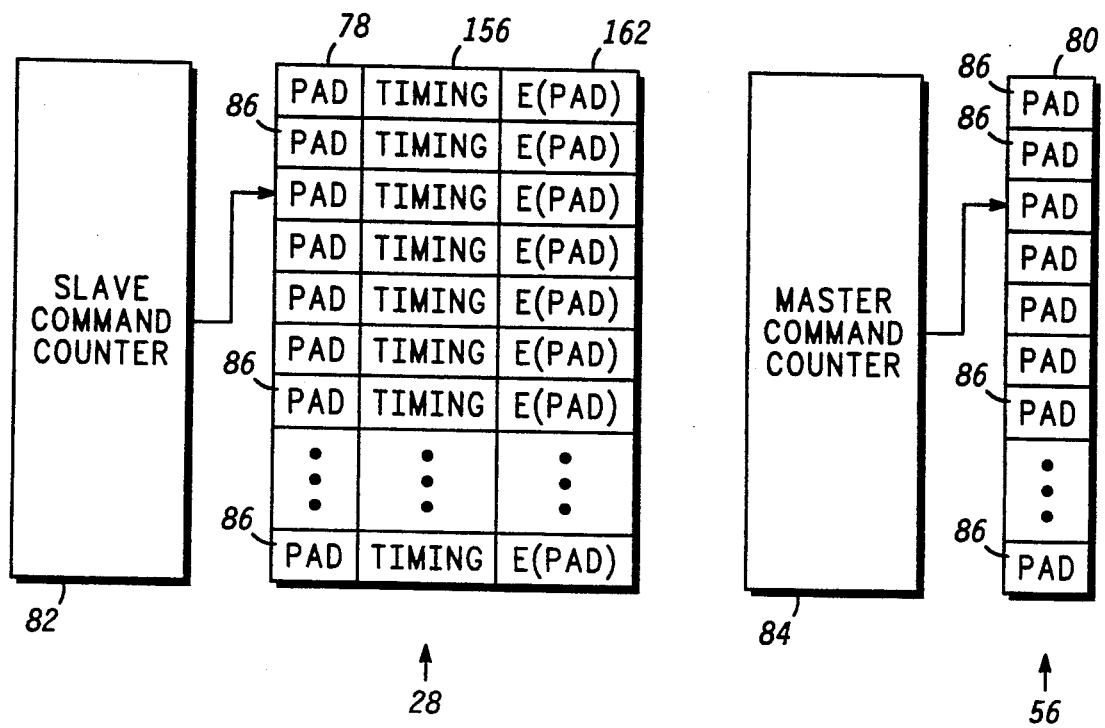
FIG. 4
FIG. 5A
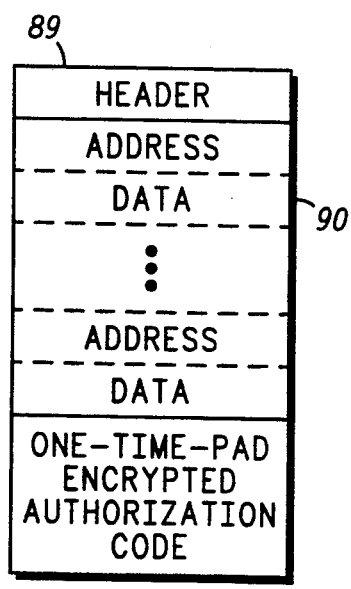
FIG. 5B
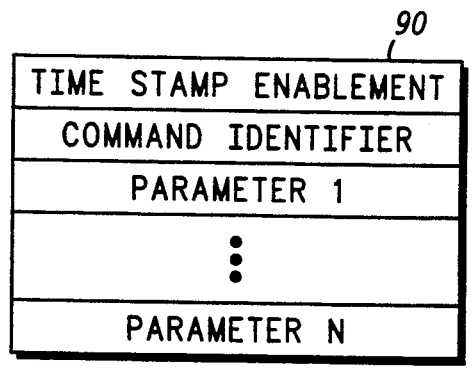

COMMAND AUTHENTICATION PROCESS

FIELD OF THE INVENTION

The present invention relates generally to the control of one device that acts upon commands issued by another device. More specifically, the present invention relates to a process for authenticating commands issued by one device before the commands are acted upon by another device.

BACKGROUND OF THE INVENTION

Many systems require a master station to issue commands for critical control functions to a remotely located slave station. One context in which this occurs is in controlling an orbiting satellite, wherein a ground-based master control station issues commands, such as orbit correction commands, to a slave satellite station. However, critical control functions are also remotely issued in connection with financial and other industrial and governmental endeavors.

The commands are considered critical due to severe harmful consequences which might result from a slave station improperly acting upon such commands. In a satellite, improper action may cause the satellite to leave its orbit or to suffer other consequences which would greatly decrease the life-span or usefulness of the satellite. Due to the great costs involved in constructing and placing a satellite in orbit, potential losses are enormous. In financial situations, money may be credited to improper accounts, again potentially leading to great financial losses. And, in other situations improper action by a slave station may pose severe risks of harm to human life and health or to the environment.

Accordingly, steps are often taken to prevent such severely undesirable results from occurring in systems where critical commands are remotely issued. Such steps are typically directed to at least two different issues. The first issue deals with insuring that a slave station will respond only to commands issued by its assigned master station. In other words, authentication processes are employed so that the slave station may have a high degree of confidence that a command it has received actually came from its assigned master station and not from some other controller. The second issue deals with insuring that a slave station which receives a command from its assigned master station has in fact received the intended command and not some other command. In other words, confirmation processes are employed to insure that no error has occurred in communicating a command.

Numerous efficient, effective, and otherwise satisfactory confirmation processes are known to those skilled in the art. On the other hand, conventional authentication processes fail to provide satisfactory solutions to authentication needs of systems such as those described above. Conventional authentication processes are complicated to implement and to operate. Such conventional processes often include dedicated "secure" hardware for implementing encryption and decryption processes. While such conventional processes do achieve effective levels of authentication security, the secure hardware's weight, cost, and limited reliability, when compared to a process using no additional hardware, are undesirable features of the conventional processes.

In addition, many conventional processes utilize a symmetric encryption process. Symmetric encryption processes use a single key for encryption and decryption. This key is kept secret so that only the master and slave stations know it. However, the system must employ a re-keying scheme in case a breach of security causes the secret key to become known or some failure keeps authorized messages from being authenticated. Such re-keying schemes become extremely complicated and costly in order to maintain a high level of authentication security.

While the above problems plague all conventional authentication processes, the problems become especially troublesome in connection with the control of satellites. In a satellite control system, physical access to a satellite after the satellite is in orbit is extremely impractical. In addition, the penalties paid for increased weight needed for secure hardware and for reduced overall reliability from using secure hardware are amplified.

SUMMARY OF THE INVENTION

Accordingly, it is an advantage of the present invention that an improved authentication process is provided.

Another advantage of the present invention is that an authentication process which does not require the use of hardware dedicated to the process is provided.

Yet another advantage is that the present invention provides an authentication process which is simple to implement and to maintain.

Another advantage is that the present invention provides a high level of authentication security. The above and other advantages of the present invention are carried out in one form by a method for communicating commands to a slave station so that the commands can be authenticated by the slave station. In accordance with this method of the present invention, a pad is received from the slave station. The pad is saved at least until a need arises for communicating a command to the slave station. This pad is combined with the command to form a message, and the message is transmitted to the slave station.

The above and other advantages of the present invention are carried out in another form by a method for authenticating commands received from a master station prior to carrying out instructions communicated by the commands. In accordance with this method of the present invention, a pad is generated using a random generating process. This pad is saved and transmitted to the master station. Later, a data communication message is received. A command and a pad value are recovered from the message. The recovered pad value is compared with the saved pad to detect correspondence. If the correspondence is not found, the command is not acted upon.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 4 shows a block diagram of pad-related data structures utilized by the master and slave stations in accordance with a preferred embodiment of the present invention;

FIGS. 5A-5B show a block diagram of a command structure and its relationship to a data communication message in accordance with a preferred embodiment of the present invention.

DESCRIPTION OF THE PREFERRED EMBODIMENT

Figure 1:
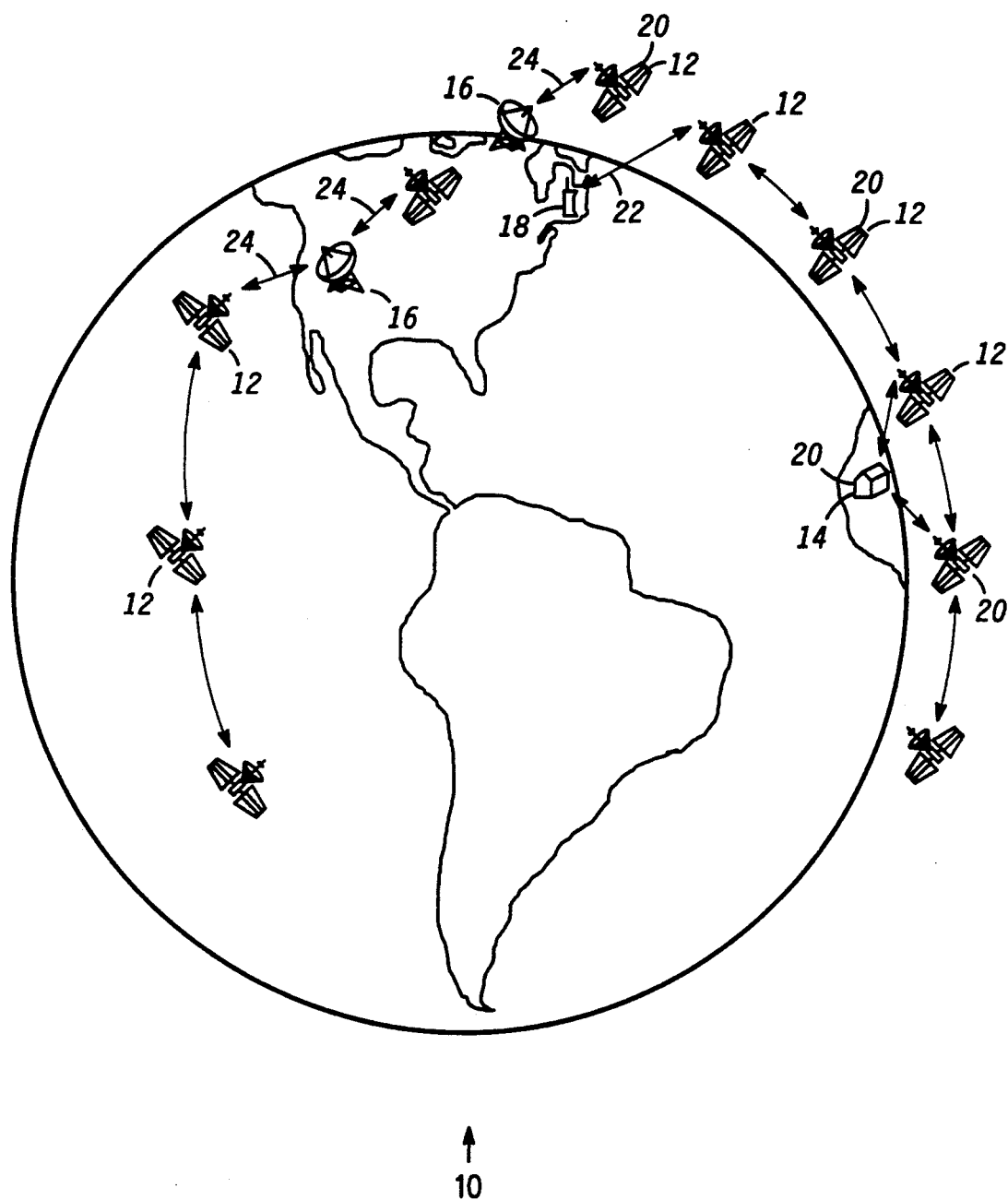
FIG. 1 shows a satellite-based communication network which encircles the earth and within which a preferred embodiment of the present invention operates.

FIG. 1 illustrates a satellite-based communication network 10. Network 10 is dispersed over the entire world through the use of many above-the-earth vehicles, such as orbiting satellites 12. In the preferred embodiment, satellites 12 occupy polar, low-earth orbits, which cause them to move relative to the earth in south-to-north and north-to-south directions. Together, satellites 12 form a constellation in which satellites 12 remain relatively stationary with respect to one another, except for their orbits converging and crossing over each other in the polar regions.

Satellites 12 communicate with devices on the ground through many gateways 14, of which FIG. 1 shows only one, a few ground control stations (GCS's) 16, of which FIG. 1 shows two, and any number of radiocommunication units 18, of which one is shown in FIG. 1. Radiocommunication units 18 may be located anywhere on the face of the earth. Gateways 14 are preferably distributed over the surface of the earth in accordance with geo-political boundaries. GCS's 16 preferably reside in the northern latitudes, where the convergence of the orbits of satellites 12 causes a greater number of satellites 12 to come within direct line-of-sight view of a single point on the surface of the earth with respect to more equatorial latitudes. Preferably, around four GCS's 16 are used so that all satellites 12 in the constellation may at some point in their orbits come within direct view of their assigned GCS 16.

Nothing prevents gateways 14 and GCS's 16 from being located together on the ground. However, gateways 14 serve a different function from that of GCS's 16. Preferably, gateways 14 primarily operate as a communications nodes 20 in network 10. Diverse terrestrial-based communications systems, such as the worldwide public switched telecommunications network (PSTN, not shown in FIG. 1), access network 10 through gateways 14. Network 10 may establish a communication circuit through a gateway 14 and the constellation of satellites 12 to a particular one of satellites 12 which is then-currently over a desired location for the other side of the circuit, as illustrated at communication path 22 between a satellite 12 and radiocommunication unit 18. Thus, each of satellites 12 also serves as a node 20 of network 10.

GCS's 16 perform telemetry, tracking, and commanding (TT&C) functions for the constellation of satellites 12. Preferably, extensive security measures are employed at each of GCS's 16 to prevent unauthorized control of satellites 12. GCS's 16 also serve as nodes 20 for network 10. However, GCS's 16 differ from gateways 14 in that they primarily perform TT&C functions for network 10 rather than interface other communication networks and systems to network 10. Due to the northern latitudes at which GCS's 16 are located, one or more satellites 12 are always in view of each GCS 16. A GCS 16 may communicate with its assigned satellites 12 within network 10 directly, as shown at direct links 24, when their orbits bring such assigned satellites 12 over the GCS 16. In addition, any GCS 16 may communicate with any satellite 12 through an overhead satellite 12 and various intermediate nodes 20 of network 10.

In the preferred embodiment, direct links 24 allow GCS's 16 to communicate with their assigned satellites 12 over such high frequencies, preferably in the Ka band, that only substantially line-of-sight propagation of communication signals results. An unauthorized party must be near a direct line-of-sight between a satellite 12 and a GCS 16 to receive such communication signals. Thus, the unauthorized receiving of these signals is difficult to accomplish for communication signals transmitted from the ground toward a satellite 12 because it requires a receiver physically placed between the ground-based transmitter and the space-based satellite receiver.

In accordance with their control function, GCS's 16 transmit commands to their assigned satellites 12. These commands are communicated to satellites 12 in data communication messages. Such commands control numerous diverse operational aspects of satellites 12. For example, such commands may activate thrusters to affect orbits, energize power systems to affect a satellite's ability to serve as a node in network 10, and control switching systems to influence a satellite's capacity to handle communication traffic. These and other commands are of critical importance to the effective operation of network 10. Alternatively, a critical command may be a NO-OP or a security trap. Consequently, network 10 takes steps to insure that these and other critical commands are authenticated to prevent damage which might otherwise be caused by mischievous tampering, negligent procedures, or deliberate sabotage.

Figure 2:
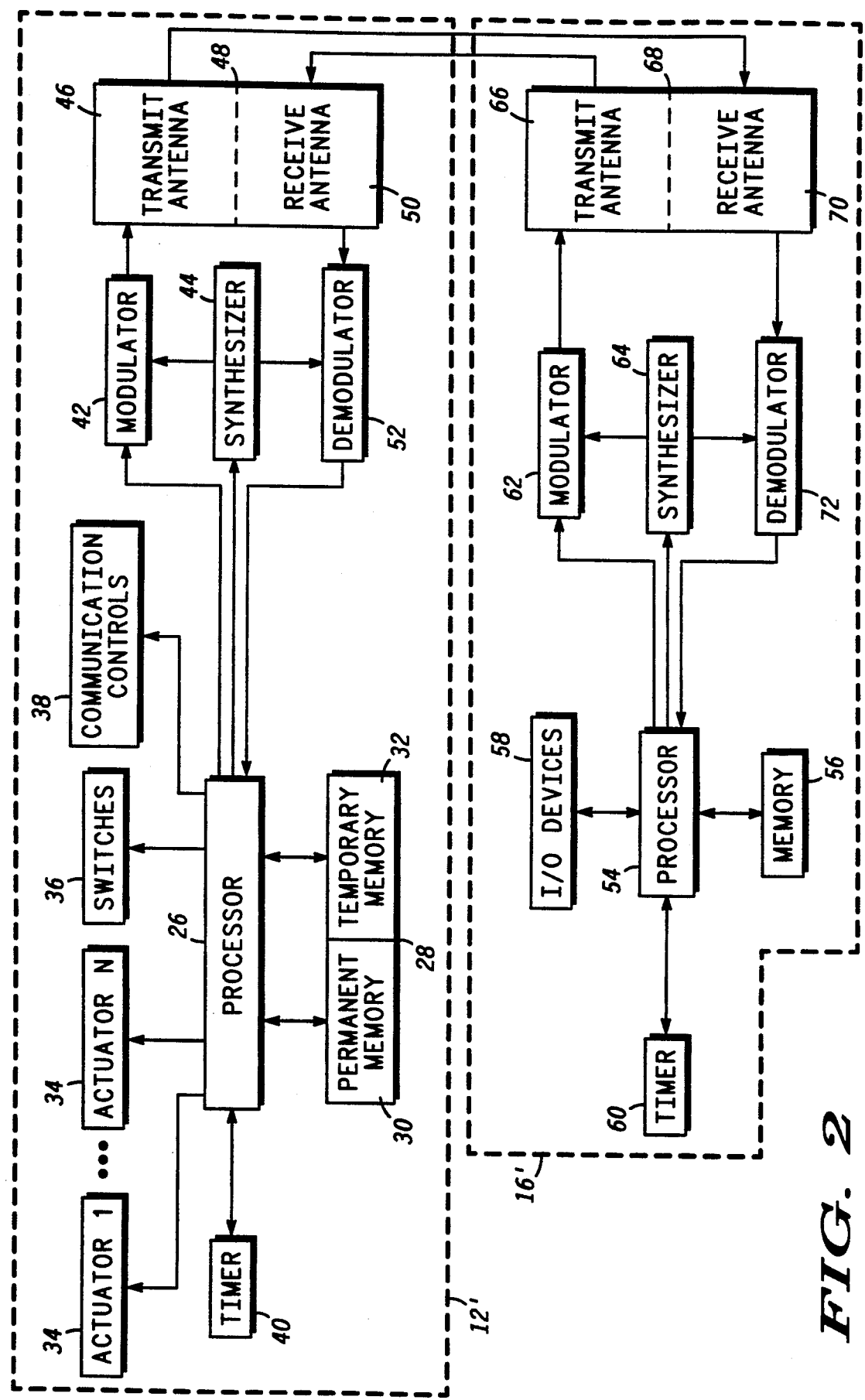
FIG. 2 shows a block diagram of hardware utilized by a satellite slave station and a ground control master station in accordance with a preferred embodiment of the present invention.

FIG. 2 shows a block diagram of hardware 16' used by a master station, such as a GCS 16, and hardware 12' used by a slave station, such as a satellite 12. As is common for master and slave stations, stations 12 and 16 represent computer controlled devices. In particular, slave station hardware 12' includes a processor 26 which communicates with a memory 28. Memory 28 includes a permanent memory 30, whose programming cannot be altered by processor 26, and a temporary memory 32, whose programming can be altered by processor 26. Those skilled in the art will recognize that the many procedures, processes, and tasks performed by slave station 12 are controlled by processor 26 in response to programming instructions stored in memory 28.

In particular, under the control of processor 26 various actuators 34 are activated and deactivated. Such actuators may cause thrusters to fire, deploy and alter positions of solar panels, and control antenna movement, to name a few activities. Likewise, various switches 36 may be operated under the control of processor 26. Switches 36 may, among other things, control the application of power to various sub-systems included within slave station 12. Furthermore, various communication controls 38 are manipulated under the control of processor 26. Controls 38 are used to allow slave station 12 to serve as a communications node 20 in the operation of network 10.

Processor 26 also communicates with a timer 40, which aids processor 26 in maintaining a date and time-of-day clock. Processor 26 transmits data, preferably using conventional QPSK techniques, by supplying such data to a modulator 42. Processor 26 also couples to a synthesizer 44 to control frequency channels over which the data are transmitted. After modulating the data in modulator 42, a communication signal is transmitted from slave station 12 at a transmit section 46 of an antenna 48. Processor 26 receives data via a receive section 50 of antenna 48, which couples to a demodulator 52. Demodulator 52 has a control input which couples to an output of synthesizer 44. Demodulator 52 demodulates the received data, which are then routed to processor 26.

Control station hardware 16' includes similar circuits. In particular, a processor 54 couples to and communicates with a memory 56. The many procedures, processes, and tasks performed by master station 16 are controlled by processor 54 in response to programming instructions stored in memory 56. Processor 54 additionally couples to various input/output (I/O) devices 58. I/O devices 58 include any conventional keyboard, pointing device, video display terminal, printer, and other automated systems, such as other computers or workstations coupled through a computer network or direct data communication link.

Processor 54 also communicates with a timer 60, which aids processor 54 in maintaining a date and time-of-day clock. Processor 54 transmits data, preferably using conventional QPSK techniques, by supplying such data to a modulator 62. Processor 54 also couples to a synthesizer 64 to control frequency channels over which the data are transmitted. After modulating the data in modulator 62, a communication signal is transmitted from master station 16 at a transmit section 66 of an antenna 68. Processor 54 receives data via a receive section 70 of antenna 68, which couples to a demodulator 72. Demodulator 72 has a control input which couples to an output of synthesizer 64. Demodulator 72 demodulates the received data, which are then routed to processor 54. As discussed above in connection with FIG. 1, the data may be communicated through a direct link 24 or via network 10 through one or more intermediate nodes 20.

Accordingly, slave station 12 and master station 16 include the type of conventional circuits which are required to operate virtually any computer controlled radiocommunication apparatus. In particular, stations 12 and 16 do not include circuits which are dedicated to the performance of command authentication. Rather, command authentication is performed primarily within processors 26 and 54 in accordance with programming instructions stored in memories 28 and 56, respectively. Processors 26 and 54 are the same processors used to operate stations 12 and 16, respectively. Thus, hardware reliability for command authentication is roughly equivalent to the reliability of the corresponding processors, memories, and radio communication support circuits. Moreover, the overall reliability of stations 12 and 16 is not reduced, nor is the weight of satellite slave station 12 increased, by the inclusion of command authentication hardware.

Of course, those skilled in the art will appreciate that the hardware shown in FIG. 2 may be substantially altered without causing a substantial change in the functions performed. For example, various timing, switching, and communication control functions may be included within processor 26, and processors 26 and 54 may be implemented using either a single processor circuit or multiple processor circuits. Likewise, modulation and demodulation functions may be configured in diverse ways, including the addition of intermediate modulation stages. Moreover, those skilled in the art will realize that stations 12 and 16 may utilize a common antenna for both the transmission and reception of communication signals.

Figure 3A:
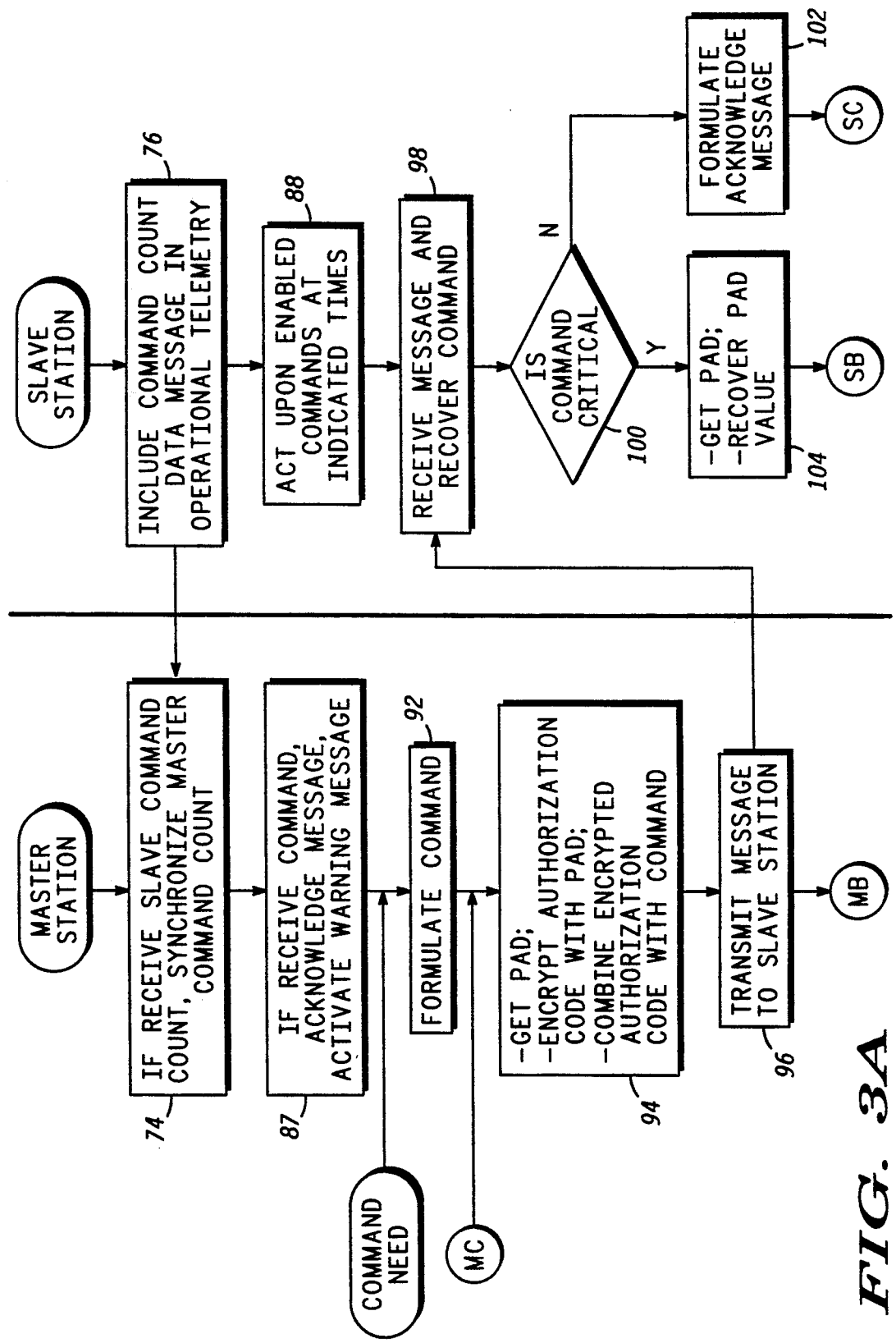
FIGS. 3A-3B together show a flow chart of tasks performed by the master station and the slave station in communicating an authenticated command therebetween in accordance with a preferred embodiment of the present invention.
Figure 3B:
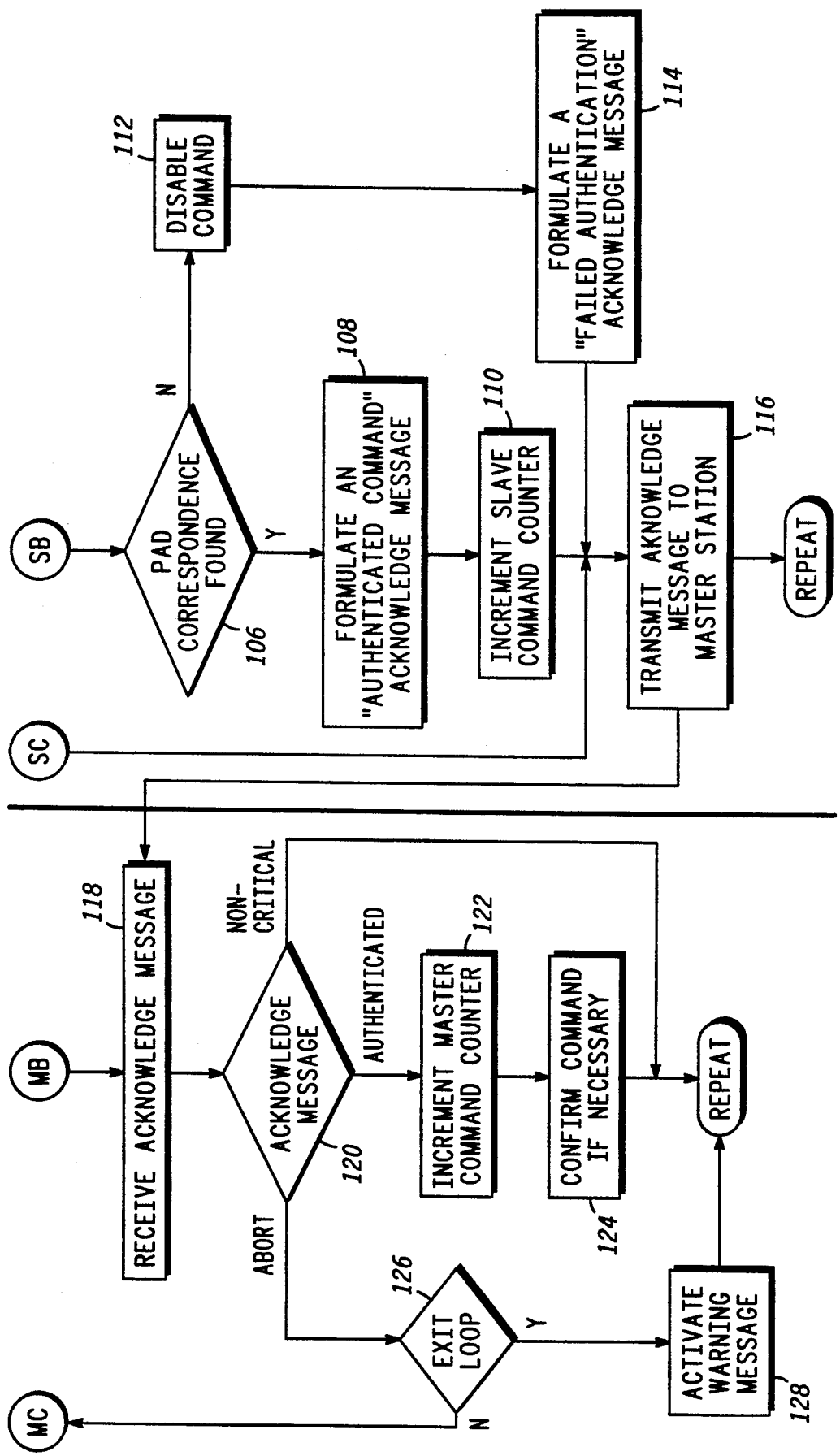

FIGS. 3A-3B together show a flow chart of tasks performed by master station 16 and slave station 12 and show the relationships between such tasks. The particular tasks shown in FIGS. 3A-3B relate to the sending and authentication of a command from master station 16 to slave station 12. Moreover, the particular tasks shown in FIGS. 3A-3B take place during the normal operation of stations 16 and 12. In other words, processors 26 and 54 (see FIG. 2) perform the tasks shown in FIGS. 3A-3B while also attending to the normal operations of stations 12 and 16, respectively.

With reference to FIG. 3A, from time-to-time master station 16 receives a slave command count data communication message from one of its assigned slave stations 12, as indicated in a task 74. Preferably, slave stations 12 incorporate the slave command count value along with other routine, operational telemetry that is communicated to master station 16, as shown in a task 76. Thus, master station 16 receives the slave command count data regularly. Moreover, this data message may be sent in the clear (i.e. need not be encrypted).

FIG. 4 shows a block diagram of pad lists 78 and 80, formed in memories 28 and 56 (FIG. 2) of slave and master stations 12 and 16, respectively, for use in the command authentication process of the present invention. Pad lists 78-80 operate in connection with slave and master command counters 82-84, respectively. Each of pad lists 78-80 includes many one-time pads 86, the precise number of which is not important to the operation of the present invention.

The term "one-time pad" refers to a stream of random information of a finite length that is combined, for example, through a linear process such as addition with a message of the same length as a means of encrypting the message. Decryption of the message requires the use of the same stream of random information or pad combined in the same or a complementary way. It is "one-time" because the same random stream is substantially never used for more than one message. Thus, a one-time pad process is said to be unconditionally secure. Each pad 86 represents a variable in which a pad value is stored. The term "pad" refers both to the variable and to the value itself. Pads 86 are generated through conventional random number generation processes. The generation of pads is discussed in more detail below. Accordingly, each of lists 78 and 80 includes a set of random numbers. Moreover, lists 78 and 80 include the same set of random numbers, preferably in the same order.

Counters 82-84 serve as pointers to lists 78-80, respectively. When counters 82 and 84 have the same value, they identify the same pad without actually mentioning the identified pad's value. Thus, in task 76 (see FIG. 3A) slave station 12 identifies a particular pad 86 to master station 16 without actually mentioning the pad's value. For this reason, the slave command count data message transmitted and received at tasks 76 and 74, respectively, may be sent in the clear.

With reference back to FIG. 3A, when master station 16 receives the slave command count value in task 74, it synchronizes its master command counter 84 (see FIG. 4) to this count value. Pads 86 are utilized by the preferred embodiment of the present invention in a manner to be discussed in more detail below. For reasons which will become apparent, master station 16 and slave station 12 utilize a common pad 86 for each command to be authenticated in accordance with the preferred embodiment of the present invention. In the event that master and slave command counters 84 and 82 might become unsynchronized, master station 16 and slave station 12 would then attempt command authentication using diverse pads 86. As a result, authorized commands would then not be authenticated. Normal operation of network 10 should keep counters 82–84 in synchronization. Nevertheless, should any synchronization problem between counters 82 and 84 occur, master and slave stations 16 and 12 will soon re-synchronize due to the performance of tasks 74–76.

While attending to normal operations, master station 16 may receive a data communication message that acknowledges the receipt of a command by a slave station 12, as shown at a task 87. Since master station 16 has not sent a command at this point in the process, such an acknowledgement is not expected and indicates a problem. For example, such an acknowledgement might indicate an attempt at tampering with the slave station 12 or a failure within slave station 12. In any event, when task 87 encounters the acknowledgement message, an appropriate warning message may be activated so that corrective action can be taken. The warning message may be displayed, printed, audibly indicated, or otherwise brought to the attention of a human operator through appropriate control of I/O devices 58 (see FIG. 2).

While attending to normal operations, slave station 12 may need to act upon or otherwise carry out commands which it has previously received, as shown at a task 88. Whether such commands require action depends upon the contents of temporary memory 32 (see FIG. 2).

FIG. 5A–5B respectively show a block diagram of a data message 89 sent to slave station 12 and a command data structure 90 which may be communicated by the data message. Data structure 90 may advantageously be repeated within memory 32 for any number of commands. Structure 90 includes a time the command's instruction. An enablement data element is used to communicate whether the corresponding command is enabled. A disabled command may not be acted upon, but an enabled command may be acted upon. A command identifier data element communicates precisely what action slave station 12 should take, and various parameters characterize that action. For example, the command identifier may instruct the firing of a particular thruster, and the parameters establish the duration of the firing. The time stamp enablement determines when the thruster firing should begin.

With reference back to FIG. 3A, during task 88 processor 26 (see FIG. 2) routinely monitors temporary memory 32 (see FIG. 2) for enabled commands which need processing at the then-current time. When the enablement and timing requirements are met, processor 26 carries out the command. Although not specifically shown, slave station 12 may then transmit a message to master station 16 to communicate the fact that the command has been acted upon.

During the normal operation of master station 16, a need eventually arises which requires that a command be sent to a particular slave station 12. For example, an orbit correction may be required or particular data may be needed from a slave station 12. When this need arises, master station 16 formulates the appropriate command, as indicated at a task 92. This command preferably takes the form illustrated in data structure 90 of FIGS. 5A–5B.

With reference to FIG. 5A, the need may, but need not, require the execution of several commands, as illustrated in message 89. In formulating the commands, addresses are associated with the data that serve as command structures 90. These addresses indicate the locations within temporary memory 32 (see FIG. 2) where the commands are to be stored. Further, an appropriate header is associated with the message. The header essentially identifies the slave station 12 to which the commands are directed and instructs that slave station 12 to load the command data within its temporary memory 32 at the indicated addresses.

With reference back to FIG. 3A, after task 92, an optional task 94 may be performed. In the preferred embodiment of the present invention a command may be classified as either a critical command or a non-critical command. Critical commands require authentication due to severe consequences which might possibly result from inappropriately performing such commands. On the other hand, non-critical commands do not have such severe consequences if inappropriately performed. One example of a non-critical command is an instruction to adjust satellite transmitter power within predetermined limits. Another example is an instruction to send a current command count. When a non-critical command is to be transmitted to a slave station 12, no authentication is required, and task 94 is not performed.

For critical commands, task 94 gets a pad 86 (see FIG. 4), encrypts an appropriate authorization code (AC) with the pad 86, and combines the encrypted AC with the commands in message 89 (see FIG. 5A). The pad 86 obtained in task 94 is preferably the pad 86 indicated by master command counter 84 (see FIG. 4). In the preferred embodiment, this is simply the next pad 86 occurring within list 80 (see FIG. 4) after the previously used pad 86. The encryption performed by task 94 is preferably a conventional linear process, such as a bit-by-bit Exclusive Or operation. In the preferred embodiment, pads 86 and AC's have the same number of bits. Since pad 86 is a random number, this scrambles the AC. As shown in FIG. 5A, the encrypted AC is appended to and becomes part of message 89.

One advantage of allowing the distinction between critical and non-critical commands is that the non-critical commands may be issued from other locations than a GCS 16 (see FIG. 1). For example, gateways 14 (see FIG. 1) may exert a limited amount of control over satellites 12 (see FIG. 1). Security is not compromised, and the complexity of the authentication process is minimized by refraining from transporting and synchronizing pad lists 80 (see FIG. 4) between all locations which may advantageously exert a limited amount of control over satellite 12. Rather, pad list 80 is kept within the secure confines of GCS 16. Another advantage of allowing the distinction between critical and non-critical commands is that a slave station 12 may be instructed to send its current command count to speed any resynchronization process.

After task 94, or task 92 for non-critical commands, a task 96 transmits data communication message 89 (see FIG. 5A), containing the commands and optionally containing the encrypted AC, to the target slave station 12. Master station 16 has now temporarily completed its part of the authentication process, and the target slave station 12 continues the authentication process.

In particular, while performing normal operations slave station 12 eventually receives data communication message 89, as indicated at a task 98. Task 98 then recovers the command portions of message 89. In a query task 100, slave station 12 examines the command identifier portions of the commands in message 89 to determine if at least one command in message 89 is a critical command. Slave station 12 may decide whether a command is critical or not by performing a table look-up operation upon a table (not shown), preferably programmed into permanent memory 30 (see FIG. 2).

If no command included within message 89 is a critical command, then slave station 12 performs a task 102. In task 102, processor 26 of slave station 12 formulates an acknowledgement message which carries data indicating that a non-critical command has been received. Typically, a non-critical command will be programmed with its enablement data element (see FIG. 5B) in an enabled state, and slave station 12 will act upon it in due course. The time stamp portion of the command (see FIG. 5B) may be programmed to indicate that the command should be performed immediately. In this case, the next time slave station 12 performs task 88, the command will be acted upon.

If at least one command included within message 89 is a critical command, station 12 performs a task 104. Task 104 obtains a pad 86 from list 78 (see FIG. 4). In the preferred embodiment of the present invention, the particular one of pads 86 selected in task 104 corresponds to the value then-currently in slave command counter 82 (see FIG. 4). This pad is preferably the next pad 86 occurring within list 78 after the previously used pad 86.

Task 104 then uses the selected pad 86 to recover a pad value from the encrypted version of the authorization code (AC) included in message 89 (see FIG. 5A). As discussed above, in the preferred embodiment of the present invention a pad 86 is used to encrypt an AC using an Exclusive Or operation. Task 104 decrypts using an Exclusive Or operation between the selected pad 86 and the encrypted AC.

Referring now to FIG. 3B, processor 26 of slave station 12 next performs a query task 106. Task 106 evaluates the pad value results of task 104 to determine whether the AC is a correct AC. This determination may be made by comparing the recovered AC with one or more values programmed in memory 28, and preferably permanent memory 30 (see FIG. 2). If the recovered AC is correct, then the recovered pad value matched the selected pad 86, and a correspondence between the pad 86 used to encrypt the AC and the pad 86 used to decrypt the encrypted AC has been established. In this situation, the command may be considered authenticated. Since pads 86 are substantially random numbers, slave station 12 can have a level of confidence roughly equivalent to $1-2^{-n}$, where n is the number of bits included in each pad 86, that the command originated from its master station 16.

In a first alternative embodiment, the AC need not be used at all in the authentication process. Rather than encrypting and decrypting an AC, a pad 86 may be included directly within message 89 by master station 16 and directly recovered from message 89 by slave station 12. In this situation slave station 12 may evaluate the recovered pad value in a more straightforward fashion. In particular, the recovered pad value may be directly compared with the selected pad from list 78 to detect correspondence.

In a second alternative embodiment, the AC may advantageously be encrypted with a pad 86 as discussed above. However, slave station 12 may decrypt the encrypted authorization code by an Exclusive Or operation with an approved AC rather than with the selected pad. In this situation, slave station 12 evaluates the recovered pad value by directly comparing the results of the Exclusive Or operation with the selected pad 86. Regardless of the specific embodiment utilized, those skilled in the art will appreciate that slave station 12 evaluates a recovered pad value to detect a correspondence between the pad 86 used by master station 16 and the pad 86 selected by slave station 12.

When task 106 detects pad correspondence, a task 108 formulates an "Authenticated Command" acknowledgment message. A task 110 then increments slave command counter 82 (see FIG. 4). The incrementing of counter 82 signifies that the previously selected pad 86, which was utilized above in tasks 104-106, will not be used again by the authentication process. Of course, those skilled in the art will appreciate that this does not mean that the pad value carried by this previously selected pad 86 cannot occur again. Rather, the probability of any pad 86 having any particular value will remain approximately $2^{<n}$.

When task 106 fails to detect pad correspondence, a task 112 disables the command. The command may be disabled by manipulating the enablement data element in command data structure 90 (see FIG. 5). As a result of disabling the command, satellite 12 will not act upon the command. Next, a task 114 formulates a "failed authentication" acknowledgement message. This "failed authentication" message may advantageously include details relating to the identity of the command or may include the entire command. Such data may help master station 16 to determine the cause of the failed authentication acknowledgement message and to take appropriate responsive action.

After the acknowledgement message of task 102, 110, or 114 has been formulated, a task 116 transmits the acknowledgement message back to master station 16. At this point, slave station 12 has completed its part in the authentication process, and the procedure illustrated in the flow chart of FIGS. 3A-3B repeats. In other words, slave station 12 continues with normal slave station operations. Such normal operations will cause slave station 12 to act upon enabled commands at the programmed times, as discussed above in connection with task 88.

While slave station 12 has been authenticating message 89 (see FIG. 5A), master station 16 has been engaging in normal station operations. Eventually, the acknowledgement message is received by master station 16, as indicated at a task 118. A query task 120 evaluates the acknowledgement message. When an Authenticated Command acknowledgement message is received, a task 122 increments master command counter 84 (see FIG. 4). The incrementing of counter 84 signifies that the previously selected pad 86, which was utilized above in task 94, will not be used again by the authentication process. The incrementing of counter 84 also keeps counter 84 synchronized with slave command counter 82 (see FIG. 4). The next critical command will utilize a different pad 86 for authentication purposes. By refraining from using the same pad twice, the security level of the authorization process is maintained at a high level.

After task 122, a task 124 performs any confirmation processes which may be required. As discussed above, confirmation processes differ from authentication processes. Authentication processes ensure that commands originate only from authorized sources. Confirmation processes insure that the commands received by slave station 12 are the intended commands.

Due to the programmable nature of the present invention, great flexibility in confirmation processes is provided. These confirmation processes are controlled by master station 16. For noncritical commands, no confirmation is needed. Rather, non-critical commands do not lead to severe consequences if improperly performed, and such commands may simply be repeated as necessary.

For critical commands, procedures adopted by master station 16 may advantageously reflect how critical different commands are. For example, low-level critical commands need not require any confirmation. Such commands may be sent with a time stamp and enablement data element of command structure 90 (see FIG. 5B) set for desired execution by slave station 12. For low-level critical commands master station 16 need not take any action in task 124. Medium-level critical commands may be sent with a time stamp and enablement data element of command structure 90 set for a future execution by slave station 12. After acknowledgement is received, master station 16 may confirm the command by having slave station 12 read the command back to master station 16 in task 124. If the command is correct on the read-back operation, master station 16 takes no further action. But, if the read-back operation indicates an incorrect command, then master station 16 may disable or write over the command. High-level critical commands may be sent in a disabled state. A read-back operation may be performed in task 124. If the read-back is correct, then another command message may enable the command, and another read-back operation may confirm that the command was in fact enabled. If high-level critical commands are incorrect in the read-back operation, chances are that no preventive action is needed because the command should be disabled anyway. These and other confirmation processes which are known or obvious to those skilled in the art are contemplated at task 124.

After task 124 or when task 120 detects an non-critical command acknowledgement, the procedure illustrated in the flow chart of FIGS. 3A-3B repeats for master station 16. In other words, master station 16 continues with normal master station operations.

When task 120 detects a failed authentication acknowledgement message, a query task 126 determines whether to exit a programming loop. If master station 16 decides not to exit the loop, then program control loops back to task 94, discussed above. Generally speaking, task 94 appends a pad to a critical command and a subsequent task sends the command and pad to slave station 12. However, for this iteration of the loop, master station 16 assumes that slave command counter 82 and master command counter 84 (see FIG. 4) have gotten slightly out of sync. Accordingly, the command is repeated using subsequent pads 86 from list 80 (see FIG. 4) in an attempt to get slave station 12 to authenticate the command. The command transmission is repeated with different pads 86 for a predetermined number of iterations or until an Authenticated Command acknowledgement message is received. If this predetermined number is reached, task 126 exits the loop to a task 128, which activates an appropriate warning message. After task 128, program control for master station 16 repeats the procedure illustrated in the flow charts of FIGS. 3A-3B.

The procedure discussed above in connection with FIGS. 3A-3B assumes that lists or sets of pads 86 are already stored within memories 32 and 56 (see FIG. 2) of slave and master stations 12 and 16, respectively. In the preferred embodiment of the present invention, no limits are placed on the number of critical commands which may be transmitted between stations 16 and 12. In other words, the procedures shown in FIGS. 3A-3B repeat for an indefinite number of iterations. The number of iterations is potentially extremely large over the life span of slave station 12. In addition, a finite amount of memory is dedicated to storing lists 78 and 80. Accordingly, the present invention includes a procedure for creating lists 78 and 80 as needed. This set-up procedure is shown in a flow chart presented in FIGS. 6A-6B.

The procedure for creating lists 78 and 80 utilizes a public key or asymmetric encryption system. Those skilled in the art will appreciate that an asymmetric system uses one key or value to encrypt messages and another key to decrypt messages. The encryption key is considered a public key because it can be made public without compromising system security.

Figure 6A:
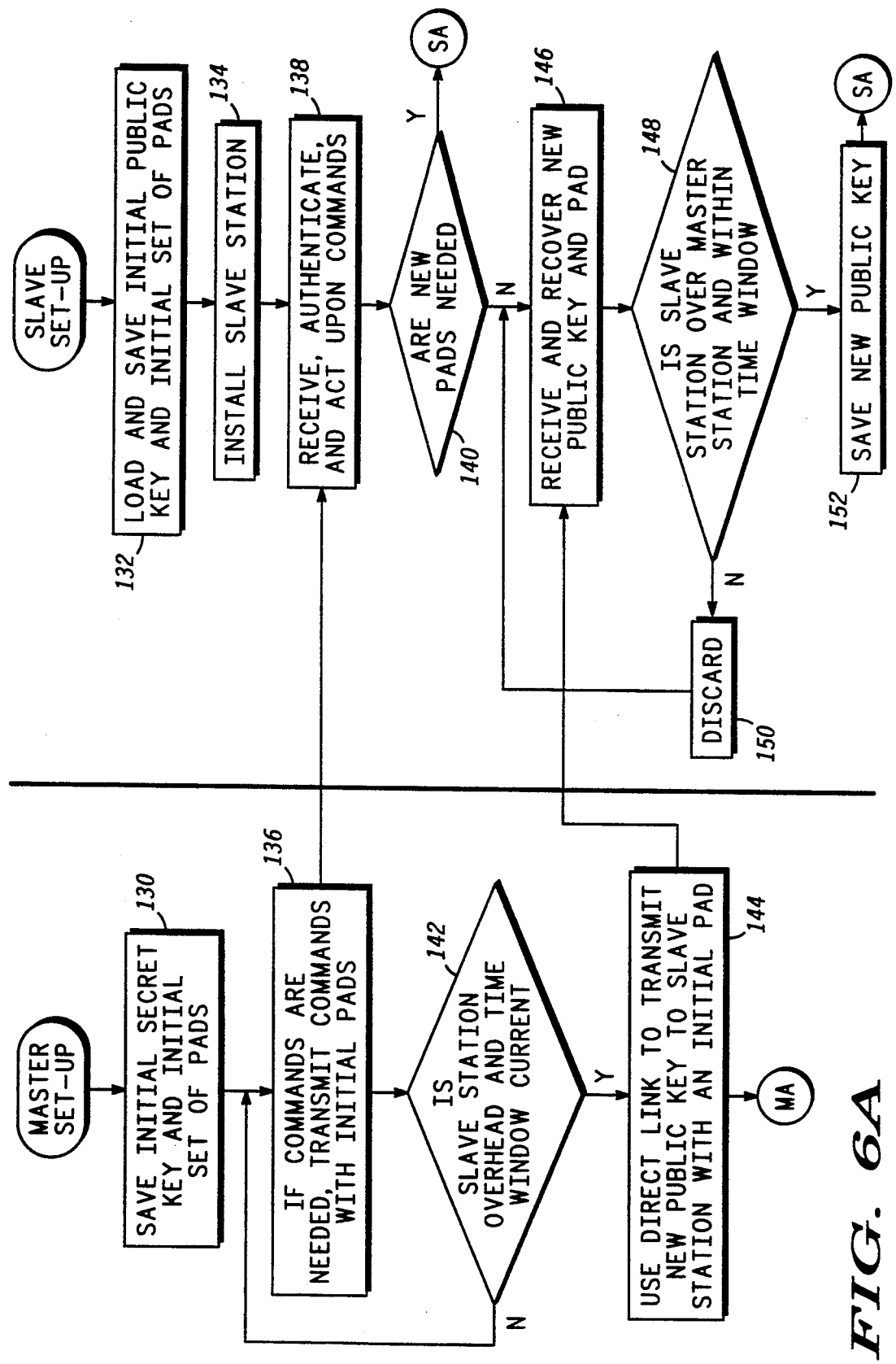
FIGS. 6A-6B together show a flow chart of tasks performed by the master station and the slave station in establishing lists of pads in accordance with a preferred embodiment of the present invention.

With reference to FIG. 6A, an initial secret, decryption key and an initial set of pads 86 are stored within memory 56 of master station 16 at a task 130. These initial values are generated using conventional processes before slave station 12 is installed, or launched in the case of a satellite slave station 12. The same initial set of pads 86 is stored within memory 28 of slave station 12 at a task 132. Task 132 also stores an initial public encryption key in memory 28 of slave station 12. The public key is preferably stored in the permanent portion 30 of memory 28 so that, with a high degree of confidence, it will remain available throughout the life of slave station 12. Initial pads 86 may be stored in either permanent memory 30 or temporary memory 32 of slave station 12.

In FIG. 6A, task 132 occurs before installation of slave station 12 at a remote location (e.g. in orbit), so physical access to slave station 12 exists prior to launch. If there is concern about physical security of the initial set of pads 86 then the initial set of pads may be generated by slave station 12 after installation and automatically sent to master station 16 using substantially the process shown in FIG. 6B (infra) for subsequent pads 86.

Figure 6B:
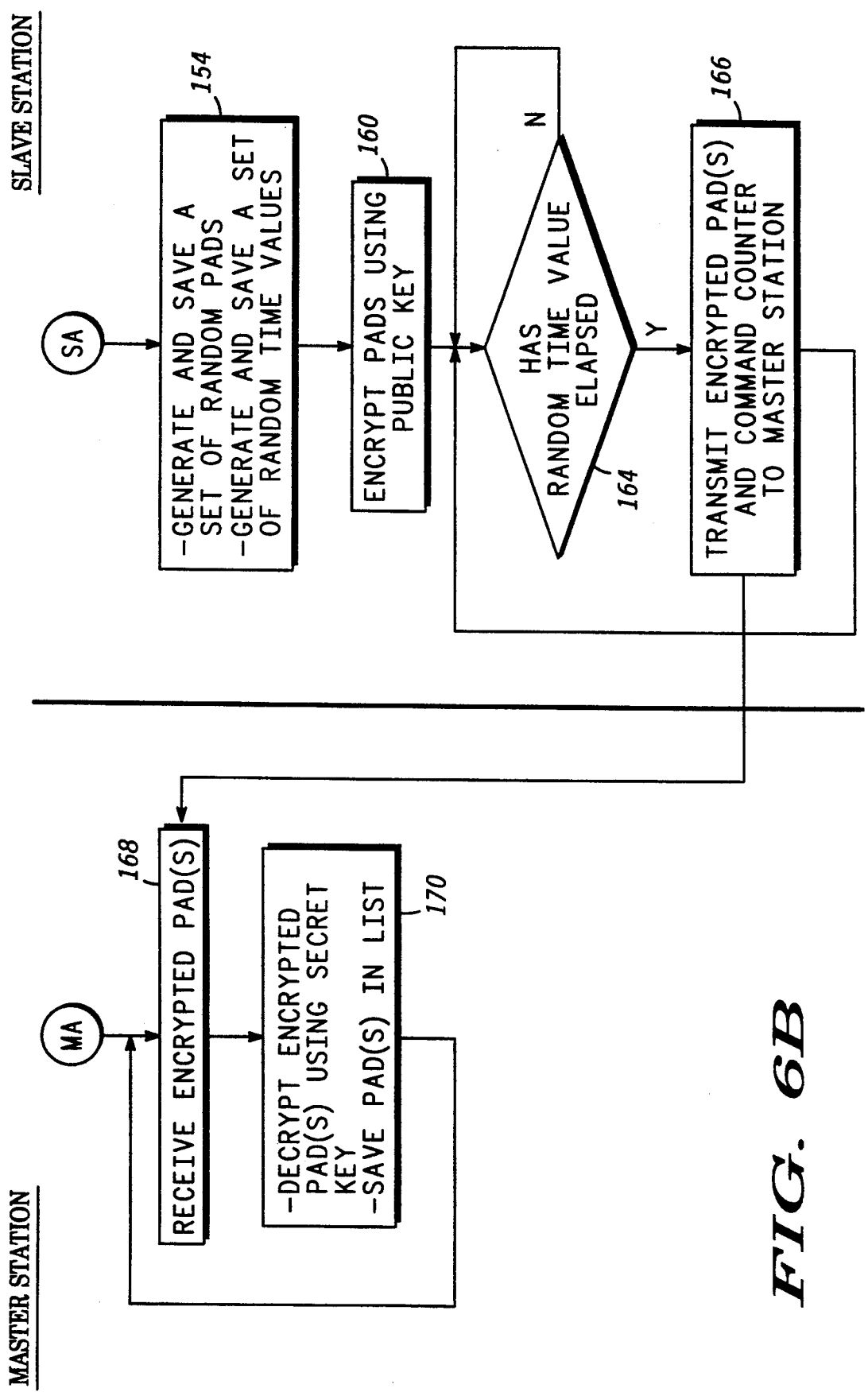

After task 132, a task 134 calls for launching or otherwise installing slave station 12 at a remote location. In accordance with the process of the present invention, future physical access to slave station 12 is not needed. Immediately after slave station 12 has been installed, an urgent need may arise for issuing some initial commands. Master station 16 transmits such initial commands at a task 136 and slave station 12 receives such initial commands at a task 138. The authentication process discussed above in connection with FIGS. 3A-3B is used in tasks 136-138. The commands are covered (encrypted) using the initial pads 86 loaded prior to launch and saved in tasks 130 and 132, or alternatively initial pads 86 generated in orbit via tasks 154-170 (FIG. 6B, infra). Slave station 12 acts upon such initial commands, when authenticated, as discussed above. In other words, tasks 136-138 relate to the normal operation of master and slave stations 16 and 12, respectively.

In accordance with this normal operation, slave station 12 performs a query task 140. Task 140 determines whether a new set of pads 86 is needed. This need may be precipitated by having already consumed most of pads 86 within list 78 (see FIG. 4). Alternatively, task 140 may reach this conclusion from a failure to receive any authenticated critical command from master station 16 within a predetermined period of time. Such a lack of critical commands over a long period possibly indicates that a serious failure in the authentication system has occurred. A new set of pads 86 will often permit recovery from such serious failures.

When task 140 decides that a new set of pads 86 is not needed, slave station 12 continues with normal operations. In the meantime, following launch of station 12, master station 16 includes a query task 142 in its normal operations. Task 142 determines whether slave station 12 is overhead and within a predetermined timing window. Slave station 12 is directly overhead any GCS 16 specifiable by a master GCS 16 when master station 16 can communicate with it through direct link 24 (see FIG. 1). The predetermined timing window is designed to occur only when slave station 12 is overhead. So long as the location and timing of slave station 12 do not meet the criteria of task 142, master station 16 continues with its normal operations. On the other hand, when slave station 12 is overhead and within the predetermined timing window, master station 16 performs a task 144.

Task 144 transmits a new public key to slave station 12 in a set-up data communication message. This new public key is not encrypted, and need not be decrypted at slave station 12. The set-up message is formatted as a command to slave station 12 and is considered a critical command. Thus, the set-up message includes an authentication code. Immediately after launching slave station 12, this authentication code relies upon one of the initial pads 86 saved above in task 130 (or 170, FIG. 6B, infra). As discussed above in connection with FIGS. 3A-3B, master station 16 may expect some sort of acknowledgement message in response to the set-up message.

Slave station 12 receives the set-up message at a task 146. The new public key is recovered from the message, the message is authenticated, and an acknowledgement message is transmitted back to master station 16. After task 146, a query task 148 then determines whether satellite 12 is over master station 16 and within the predetermined timing window. The location data may be obtained by determining whether the set-up message was received over direct link 24 (see FIG. 1) or through other links in network 10. The timing window data may be programmed in permanent memory 30. If task 146 fails to determine that slave station 12 is at the prescribed location and time, the newly received public key is discarded in a task 150, and slave station 12 continues with its normal operations. On the other hand, if the location and timing window are correct, then the new public key is saved within temporary memory 32 in a task 152.

Security is enhanced by limiting the transmission of new public keys to occurring only while slave station 12 is overhead. In the preferred embodiment, slave stations 12 are overhead 2-14 times daily, depending on latitude. As discussed above, the communication signals transmitted from the ground to a satellite are extremely difficult to intercept, and the chances of mischief resulting from an unwanted interception of the new public key are greatly reduced.

Referring to FIG. 6B, after task 152 and when task 140 determines that a new pad list needs to be generated, a task 154 generates and saves a new set of random pads 86 in list 78 (see FIG. 4). Task 154 also generates and saves a set of random timing values, and saves them in a list 156 (see FIG. 4) associated with the random pads 86.

Task 154 need not be performed as a high priority task by slave station 12. Rather, slave station 12 may perform more pressing normal operations and eventually generate the random values as it has time to do so. Those skilled in the art will appreciate that pseudorandom number generation processes are well known and that such processes may advantageously be seeded with arbitrary values, such as time values or other miscellaneous but time-variant data, to produce substantially random values. The random timing values are formatted as durations, with some predetermined limitation on a maximum duration allowable. These timing values will be used in a subsequent task for transmitting the random pads to master station 16.

After task 154, slave station 12 performs a task 160 to encrypt the random pads generated above in task 154 using the highest priority public key available to slave station 12. The preferred embodiment of the present invention utilizes a well known encryption technique, such as the RSA or Hellman techniques. The encrypted pads (E(Pad)) are stored in a list 162 (see FIG. 4), in which the encrypted pads are associated with the pads 86 and random timing values of lists 78 and 156, respectively. Task 160 may also be performed in a low priority mode by slave station 12, where slave station 12 is free to perform more pressing tasks before completing task 160. Accordingly, encryption demands do not adversely consume critical processing power needed for the normal operation of slave station 12.

The highest priority public key available to slave station 12 is usually the one most recently received from master station 16. Thus, the public key initially loaded in task 132 need not be used unless no other public key has been received from master station 16. In addition, when task 140, discussed above, decides that a new set of pads is needed because no critical messages have been received from master station 16 within a predetermined period of time, task 160 may utilize the initial public key for encryption as a default under the assumption that the other public key may have been corrupted.

After task 160, slave station 12 again attends to its normal operations. These normal operations include a query task 164, which examines list 156 of random timing durations. If the duration indicated in association with the next pad 86 has transpired, then a task 166 transmits the corresponding encrypted pad from list 162 to master station 16. This pad is included in a data communication message with a count value from slave station command counter 82. In an alternate embodiment, task 166 transmits several encrypted pads, but less than the entire set of pads, to master station 16. After task 166, slave station 12 returns to its normal operations, including the performance of task 164. Slave station 12 will loop through tasks 164 and 166 until all pads have been transmitted to master station 16. The pads will have been transmitted at random intervals to further reduce the likelihood of them being intercepted and decrypted. This transmission of encrypted pads is not restricted to occurring only while slave station 12 is over its master station 16. Rather, the data messages which carry encrypted pads may be transmitted from slave station 12 through network 10 (see FIG. 1) at any time and from any location.

While slave station 12 has been generating random numbers and encrypting pads, master station 16 has continued with its normal operations. Eventually, master station 16 receives a data communication message which carries encrypted pads and the slave command counter value, as indicated at a task 168. When this message is received, a task 170 decrypts the received pad(s) using a secret key. This secret key corresponds to the last public key sent to slave station 12 or to the initial public key loaded in slave station 12. Task 170 saves the decrypted pads in list 80 (see FIG. 4) and also saves the slave command count value for use in synchronization. After task 170, master station 16 continues with its normal operations, which, from time-to-time, includes the receipt of additional encrypted pads in task 168.

Accordingly, random pads are generated as necessary, largely under the control of slave station 12. However, master station 16 may repeat the transmission of new public keys to slave station 12 on a regular interval, when a compromise in security is suspected or when an authentication process failure is suspected. Slave station 12 will respond to this new public key with a new set of pads.

In summary, the present invention provides an improved authentication process. The process of the present invention does not require the use of hardware dedicated to authenticating commands. Rather, the process of the present invention is simple to implement and to maintain. No physical access to a slave station is required, and the process may be implemented along with other normal operational processes using only hardware which is needed to perform such normal operations.

In addition, the present invention provides a high level of authentication security. One-time pads are generated as needed for authenticating commands, then discarded. The same pad is not reused, and the process is considered unconditionally secure. The pads are communicated between the slave and master stations using an asymmetric, public key encryption system. These pads are not communicated often, and the pads are communicated at random intervals to further enhance security. Re-keying is a simple operation due to the use of a public key in the slave stations. Security is further enhanced by restricting the re-keying operation to occurring only when a satellite slave station is positioned in a particular location and timing window. The particular location is one where unintended receipt of communication signals transmitted from the master station to the slave station is exceptionally difficult due to the line-of-sight nature of the signals.

The present invention has been described above with reference to preferred embodiments. However, those skilled in the art will recognize that changes and modifications may be made in these preferred embodiments without departing from the scope of the present invention. For example, those skilled in the art will appreciate that the numbers described herein as being random are to be considered substantially random for the practical purposes with which the present invention is concerned, but may in an absolute sense be considered pseudorandom numbers. Moreover, those skilled in the art will appreciate that the hardware and specific tasks discussed herein are subject to substantial modifications while still accomplishing substantially the same results. These and other changes and modifications which are obvious to those skilled in the art are intended to be included within the scope of the present invention.

What is claimed is:

1. In a system comprising a master station and a slave station, wherein said master station includes a first processor, a first transmitter, a first receiver and a first memory, wherein said slave station includes a second processor, a second transmitters, a second receiver and a second memory, a method for communicating commands from said master station to said slave station so that said commands can be authenticated by said slave station, said method comprising steps of:

(a) receiving by said first receiver in said master station a first code pad common with a second code pad stored in said second memory in said slave station;

(b) storing said first code pad in said first memory;

(c) combining said first code pad with said command by said first processor to form a message; and (d) transmitting said message by said first transmitter to said slave station.

2. The method as claimed in claim 1, wherein:

said step (a) includes a receiving substep (a1) wherein said first receiver in said master station receives a first set of code pads transmitted by said second transmitter in said slave station;

said step (b) includes a storing substep (b1) wherein said first set of code pads is stored in said first memory; and said step (c) includes a combining substep (c1) wherein said first processor combines a first selected one of said first set of code pads with said command to form said message.

3. The method as claimed in claim 2, further including steps of:

(e) repeating, by instructions from said first processor, said substeps (b1), (c1) and said step (d) for a second command;

said combining substep (c1) includes a substep (c2) of combining a second selected one of said first set of code pads with said second command by said first processor to form a second message; and said step (d) includes a substep (d1) of transmitting said second message by said first transmitter to said slave station.

4. The method as claimed in claim 2, further including a step (e) of repeating by instructions from said first processor said substep (c1) and said step (d) for a multiplicity of iterations, each of said iterations of said substep (c1) utilizing a different code pad from said first set of code pads for combination with each different one of said multiplicity of commands to form a multiplicity of messages, each of said iterations of said step (d) transmitting a different one of said multiplicity of messages by said first transmitter to said slave station.

5. The method as claimed in claim 4, additionally comprising a step of repeating said steps (a1) and (b1) to receive and save additional sets of first code pads so that an adequate supply of said additional sets of first code pads are available for said multiplicity of iterations.

6. A method as claimed in claim 4, wherein said system further comprising a counter in said slave station and a master command counter in said master station, additionally comprising steps of:
   (f) receiving by said first receiver, a command counter data message transmitted by said second transmitter form said slave station, said command counter data message including a slave command count value from said counter in said slave station;
   (g) synchronizing a master command count in said master command counter to said slave command count value;
   (h) maintaining said master command count in said master command counter to reflect the number of said messages transmitted through said iterations in said step (e); and
   (i) obtaining said different code pad for use in said iterations of said step (c1) in correspondence with said master command count of said master command counter.

7. A method as claimed in claim 6, additionally comprising steps of:
   (j) receiving by said first receiver, after each iteration of said step (d), an acknowledgement data message, said acknowledgement data message including data describing whether an immediately previously received message transmitted in an immediately previous step (d) was authenticated by said slave station; and
   (k) adjusting said master command count in said master command counter in said step (h) only when said step (j) encounters an acknowledgement data message indicating that said immediately previously transmitted message was authenticated by said slave station.

8. A method as claimed in claim 2, additionally comprising a step (1) of transmitting by said first transmitter a set-up data communication message to said second receive in said slave station, said set-up data communications message including an encryption key, said encryption key having a form not requiring decryption by said second processor in said slave station, said step (1) occurring prior to said substep (a1).

9. A method as claimed in claim 8, wherein said substep (a1) includes a substep (a2) of decrypting said set of first code pads by said first processor using a secret decryption key corresponding to said encryption key.

10. A method as claimed in claim 8, wherein:
   said method is performed by a ground control station transmitting said messages by said first transmitter in said steps (d) and (1) to said second receiver located in an above-the-earth (ATE) vehicle, said ATE vehicle comprising said slave station;
   said ground control station and said ATE vehicle may communicate through either a communication network having a plurality of nodes or a direct communication link therebetween; and
   said step (1) transmits said encryption key only through said direct communication link.

11. In a system comprising a master station and a slave station,
   wherein said master station includes a first processor, a first transmitter, a first receiver and a first memory, and
   wherein said slave station includes a second processor, a second transmitter, a second receiver and a second memory,
   a method for operating said slave station to authenticate commands received from said slave station prior to carrying out instructions communicated thereby, said method comprising steps of:
   (a) generating a first code pad by said second processor;
   (b) storing said first code pad in said second memory to provide a stored code pad;
   (c) transmitting said first code pad to said master station by said second transmitter;
   (d) receiving a data communication message from said master station by said second receiver;
   (e) recovering a command and a code pad from said data communication message by said second processor to provide a recovered command and a recovered code pad;
   (f) authenticating said data communication message by said second processor by evaluating said recovered code pad to detect a correspondence between said recovered code pad and said stored code pad; and
   (g) refraining from acting upon said recovered command if said step (f) fails to detect said correspondence.

12. A method as claimed in claim 11, wherein:
   said step (a) includes a substep (a1) of generating a first set of code pads by said second processor;
   said step (b) includes a substep (b1) of storing said first set of code pads in said second memory to provide a stored set of first code pads;
   said step (c) includes a substep (c1) of transmitting said first set of code pads by said second transmitter; and
   said step (f) includes substeps of:
   (f1) selecting a code pad from said stored set of first code pads by said second processor to provide a selected code pad; and
   (f2) authenticating said data communication message by said second processor by evaluating said recovered code pad using said selected code pad to detect said correspondence.

13. A method as claimed in claim 12, further including steps of:
   (h) repeating by instructions from said second processor, said steps (d), (e), (f) and (g) for a second data communication message to provide a second command and a second recovered code pas; and
   said step (f) further includes substeps of:
   (f3) selecting a second code pad from said stored set of first code pads by said second processor to provide a second selected code pad; and
   (f4) authenticating said second data communication message by said second processor by evaluating said second recovered code pad using said second selected code pad to detect said correspondence.

14. A method as claimed in claim 12, further including a step (h) of repeating said steps (d), (e), (f) and (g) by instructions from said second processor for a multiplicity of iterations to detect said correspondence for a multiplicity of data communication messages, each of said multiplicity of iterations utilizing a different code pad from said stored set of first code pads for evaluation with said recovered code pad.

15. A method as claimed in claim 14, additionally comprising a step (i) of repeating by instructions from said second processor said steps (a), (b) and (c) to generate, store and transmit additional sets of code pads so that a supply of said additional sets of code pads is available for said multiplicity of iterations.

16. A method as claimed in claim 14, wherein said system further comprises a counter in said slave station and a master command counter in said master station, additionally comprising steps of:
  (i) maintaining a count of said recovered commands detected through said multiplicity of iterations of said steps (d), (e), (f) and (g), said count being maintained in said counter;
  (j) selecting said selected code pads for use in said multiplicity of iterations of said step (f) in correspondence with said count; and
  (k) transmitting said count by said second transmitter to said master station so that said master station may maintain synchronization of said count in said counter with a master command count in said master command counter.

17. A method as claimed in claim 16, additionally comprising a step (1) of adjusting said count each time an iteration of said step (f) detects said correspondence.

18. A method as claimed in claim 12, wherein:
  said step (c) includes a substep (c1) of transmitting by said second transmitter each portion of said first set of code pads to said master station in a distinct one of a plurality of separate transmissions; and
  wherein each said distinct one of a plurality of separate transmissions is spaced apart in time by substantially random intervals from each other said distinct one of a plurality of separate transmissions.

19. A method as claimed in claim 11, wherein said step (c) includes substeps of:
  (c1) encrypting said code pad by said second processor using an encryption key to provide an encrypted code pad; and
  (c2) transmitting said encrypted code by said second transmitter.

20. A method as claimed in claim 19, additionally comprising a step (h) of receiving by said second receiver a set-up data communication message transmitted by said first transmitter, said set-up data communication message including said encryption key in a form not requiring decryption, said step (h) occurring prior to said substep (c1).

21. A method as claimed in claim 20, wherein:
  said method is performed by an above-the-earth (ATE) vehicle comprising said slave station and said master station comprises a ground control station messages including commands to said ATE vehicle;
  said ATE vehicle may communicate with said master station through either a communication network having a plurality of nodes or a direct communication link to said master station; and
  said step (h) is configured to receive said encryption key only through said direct link.

22. A method as claimed in claim 11, additionally comprising steps of:
  (h) examining said recovered command by said second processor to determine whether said recovered command is a critical command;
  (i) performing said steps (f) and (g) by said second processor if said recovered command is a critical command; and
  (j) acting upon said recovered command by said second processor if said recovered command is not critical command.

23. A method as claimed in claim 11, additionally comprising a step of transmitting by said second transmitter a failed authentication message to said first receiver in said master station if said step (f) fails to detect said correspondence so that said master station is alerted that said data communication message was received by said second receiver but was not authenticated.

24. In a system comprising a master station and a slave device,
  wherein said master device includes a first processor, a first transmitter, a first receiver and a first memory, and
  wherein said slave device is located remote from said master device and said slave device includes a second processor, a second transmitter, a second receiver and a second memory,
  a method of authenticating commands communicated between said master device and said slave device, said method comprising steps of:
    (a) generating by said second processor in slave device, a first set of random code pads;
    (b) storing said first set of random code pads in said second memory in said slave device;
    (c) transmitting said first set of random code pads from said slave device to said master device by said second transmitter;
    (d) receiving said first set of random code pads by said first receiver in said master device to provide a second set of random code pads common with said first set of random code pads;
    (e) storing said second set of random code pads from said message in said first memory;
    (f) transmitting a message by said first transmitter in said master device to said slave device, said message including a command and a first selected one of said second set of random code pads;
    (g) receiving said message by said second receiver in said slave device;
    (h) recovering a code pad from said message by said second processor to provide a recovered code pad;
    (i) evaluating said recovered code pad by said second processor to detect a correspondence between said recovered code pad and a second selected code pad common with said first selected code pad; and
    (j) refraining from executing said command by said second processor in said slave device if said step (i) fails to detect said correspondence.

25. A method as claimed in claim 24, wherein:
  said step (a) includes substeps of:
    (a1) transmitting by said first transmitter, a set-up data communication message from said master station to said slave station prior to said step (b), said set-up data communication message including an encryption key in a form not requiring decryption before use by said second processor in said slave station; and
    (a2) encrypting, by said second processor in said slave station, said first set of random code pads to provide a set of encrypted random code pads, said encrypting step utilizing said encryption key; said step (c) includes a substep (c3) of transmitting said set of encrypted random code pads by said second transmitter; and said step (d) includes substeps of:

(d1) receiving said set of encrypted random code pads by said first receiver; and (d2) decrypting, by said first processor in said master station, said set of encrypted random code pads to provide said second set of random code pads, said decrypting step utilizing a secret decryption key corresponding to said encryption key.

26. A method as claimed in claim 24, wherein:

said slave device is an above-the-earth (ATE) vehicle and said master device is a ground control station which issues commands to said ATE vehicle;

said ATE vehicle and said ground control station can communicate through either a communication network having a plurality of nodes or a direct communication link; and said substep (a1) transmits said encryption key only through said direct link.

27. A method as claimed in claim 24, wherein said steps (f), (g), (h), (i) and (j) are repeated for a multiplicity of iterations to detect said correspondence for a multiplicity of messages, each of said iterations utilizing a different random code pad from said second set of random code pads as said first selected one.

28. A method as claimed in claim 24, wherein:

said step (c) includes a substep (c1) of transmitting by said second transmitter each portion off said first set of random code pads to said master station in a distinct one of a plurality of separate transmissions; and wherein each said distinct one of a plurality of separate transmissions is spaced apart in time by substantially random intervals from each other said distinct one of a plurality of separate transmissions.

29. In a system comprising a master station and a remotely located slave station, wherein said master station includes a first transmitter for sending command to said slave station, a first receiver for receiving information from said slave station and a first memory, wherein said slave station includes a second transmitter for sending information to said master station, a second receiver for receiving command from said master station and a second memory;

a method for communicating a command from said master station to said slave station so that said command can be authenticated before being executed by said slave station, said method comprising steps of:

(a) receiving from said slave station and storing in said first memory, a first code table having multiple entries common with a second code table stored in said second memory in said slave station;

(b) receiving from said slave station and storing in said first memory, a first index value identifying a particular entry in said first code table and a corresponding entry in said second code table;

(c) obtaining said command desired to be executed by said slave station;

(d) retrieving from said first memory said particular entry in said first code table identified by said first index value;

(e) combining in said first processor said particular entry in said first code table with said command to form an encrypted command message for transmission to said slave station, wherein different code table entries produce substantially different ciphertext even for identical plaintext; and (f) using said first transmitter, transmitting said encrypted command message to said slave station for authentication utilizing said corresponding entry in said second code table identified by said first index value before execution of said command by said slave station.

30. A method as claimed in claim 29, further including steps of:

(g) receiving from said slave station a second index value corresponding to another entry in said first and second code tables; and (h) repeating said steps (c), (d), (e) and (f) for another command desired to be authenticated before being executed by said slave station.

31. A method as claimed in claim 29, further including a step (i) of repeating said steps (b) through (f) a multiplicity of times to transmit to said slave station, a corresponding multiplicity of commands desired to be authenticated before being executed.

32. A method as claimed in claim 31 further including a step of transmitting to said slave station by said first transmitter a code table regeneration message containing an encryption key in plain language for use by said slave station in encrypting a new code table.

33. A method as claimed in claim 29, wherein said first memory wherein index values are stored comprises a command counter and said step (j) comprises a step of synchronizing a master command count in a first command counter of said master station with a command count in a command counter of said slave station.

34. A method as claimed in claim 29 further comprising a substep (f1) of receiving an acknowledgement signal from said slave station indicating that said command message was authenticated by said slave station, said substep (f1) occurring after said step (f).

35. A method as claimed in claim 29, wherein said step (e) further includes a substep (e1) of including information identifying said master station in said command message.

36. A method as claimed in claim 32, further including steps of:

(i) repeating said steps (a) and (b) to receive said new code table and a new index value in said master station, said new code table and said new index value having been generated internally in said slave station, said new index value corresponding to a first entry in said new code table; and (j) storing said new code table and said new index value in said first memory, said new code table replacing said first and second code tables and said new index value replacing said first index value.

37. A method as claimed in claim 36, wherein step (a) further comprises a substep (a1) of decrypting said code table using a secret decryption key corresponding to said encryption key, after receiving said new code table and before storing said new code table in said first memory.

38. A method as claimed in claim 29, wherein said first code table is received by said master station from said slave station is encrypted form, having been encrypted by said slave station using a plain language key transmitted to said slave station by said master station, and prior to said first table being stored in said first memory for use in encrypting said commands, said first table is decrypted using a secret key corresponding to said plain language key.

39. A method as claimed in claim 29, wherein said step (a) comprises substeps of:
  (a1) transmitting a plain language encryption key from said master station to said slave station;
  (a2) receiving said encrypted message from said slave station containing said first code table in encrypted form; and
  (a3) decrypting said encrypted message to obtain said first code table for storage in said first memory in plain language form.

40. In a system comprising a master station and a remotely located slave station,
  wherein said slave station includes a first transmitter for sending information to said master station, a first receiver for receiving information from said master station and a first memory,
  wherein said master station includes a second transmitter for sending information to said slave station, a second receiver for receiving information from said slave station and a second memory,
  a method for operating said slave station so that commands or messages received from said master station can be authenticated before being executed or processed by said slave station, said method comprising steps of:
  (a) generating in said slave station, a code table containing multiple entries;
  (b) storing said code table in said first memory;
  (c) transmitting by said first transmitter a copy of said code table to said master station for storage in said second memory, so that said master station and slave station have common code tables;
  (d) transmitting by said first transmitter to said master station an index value referring to a particular entry in said common code tables;
  (e) receiving from said master station a message containing at least an authentication code and a command from said master station to said slave station to change the operation of said slave station, said message having been encrypted using a master station code table entry related in a predetermined way to a most recently transmitted index value, said encrypted message having substantially different ciphertext for the same plaintext;
  (f) decrypting said message from said master station in said slave station to retrieve a recovered command and a recovered authentication code, using a slave station code table entry related in said predetermined way to said most recently transmitted index value;
  (g) comparing said recovered authentication code with a predetermined list of authentication codes in said slave station to detect a correspondence; and
  (h) when said correspondence is detected, authenticating the command to provide an authenticated command and altering the operation of said slave station by executing said authenticated command.

41. A method as claimed in claim 40, wherein said authentication code is an entry in said code table in said master station and said step (g) compares said recovered authentication code with entries in said code table in said slave station.

42. A method as claimed in claim 40 wherein said steps (a) through (c) further comprise the steps of:
  receiving a plain language encryption key from said master station;
  using said plain language encryption key to encrypt said copy of said code table; and
  transmitting said copy of said code table to said master station in encrypted form for decryption in said master station using a private decryption key different than said plain language encryption key.

43. A method as claimed in claim 40, further comprising a substep (g1) of sending an acknowledgement signal to said master station indicating that said command was or was not authenticated, after said step (g) and before said step (h).

44. A method as claimed in claim 43, further comprising a step of waiting after said substep (g1) to receive an execute signal from said master station before executing said authenticated command.

45. A method as claimed in claim 43, further comprising a step of changing said index value stored in said first memory in said slave station to a new index value and notifying said master station of such change so that a corresponding change is made in said index value held by said master station, said changing step occurring after said step (f).

46. A method as claimed in claim 45, wherein substep (g1) further comprises a step of sending an acknowledgement signal to said master station indicating that said command was authenticated, said acknowledgement signal including a command just received from said master station.

47. A method as claimed in claim 46, further comprising prior to said substep (g1), a step of encrypting said command just received using a code table entry in said slave station corresponding to said new index value.

48. A method as claimed in claim 47, further comprising a step of waiting, after said substep (g1), to receive an execute signal from said master station before executing said authenticated command.

49. A method as claimed in claim 40, further comprising steps of:
  generating a new code table in said slave station containing new entries when all entries in a current code table have been exhausted; and
  repeating steps (a) through (h) based on said new code table.

* * * * *

UNITED STATES PATENT AND TRADEMARK OFFICE
CERTIFICATE OF CORRECTION

Page 1 of 2

PATENT NO. : 5,293,576
DATED : March 8, 1994
INVENTOR(S) : Thomas James Mihm, Jr. et al.

It is certified that error appears in the above-indentified patent and that said Letters Patent is hereby corrected as shown below:

In column 16, claim 1, line 20, change the word "transmitters" to --transmitter--.

In column 18, claim 11, line 8, change the word "slave" to --master--.

In column 18, claim 13, line 53, change the word "pas" to --pad--.

In column 19, claim 19, line 42, after the word "code" insert --pad--.

In column 20, claim 22, line 5, after the word "not" insert --a--.

In column 20, claim 24, line 23, change the word "of" to --for--.

In column 20, claim 24, line 26, after the word "in" insert --said--.

In column 21, claim 28, line 32, change the word "off" to --of--.

In column 21, claim 29, line 43, change the word "command" to --commands--.

In column 21, claim 29, line 48, change the word "command" to --commands--.

UNITED STATES PATENT AND TRADEMARK OFFICE
CERTIFICATE OF CORRECTION

PATENT NO. : 5,293,576
DATED : March 8, 1994
INVENTOR(S) : Thomas James Mihm, Jr., et. al.

It is certified that error appears in the above-indentified patent and that said Letters Patent is hereby corrected as shown below:

In column 22, claim 38, line 66, change the word "is" to --in--.

Signed and Sealed this

Twenty-fourth Day of January, 1995

Attest:

BRUCE LEHMAN

Attesting Officer       Commissioner of Patents and Trademarks